F. M. MILLER & A. F. STEYER.
TIRE RIM.
APPLICATION FILED SEPT. 14, 1909.

988,890.

Patented Apr. 4, 1911.
2 SHEETS—SHEET 1.

Witnesses
Phil E. Barnes
P. M. Smith

Inventors
Frank M. Miller
Arthur F. Steyer
By Victor J. Evans
Attorney

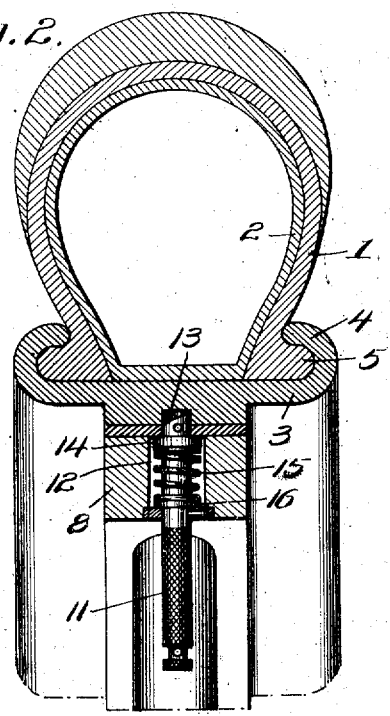
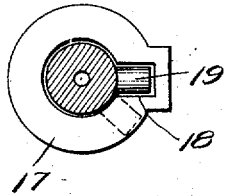
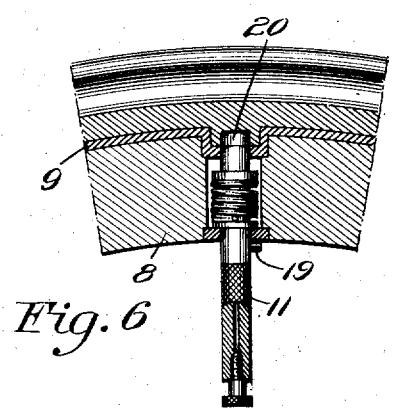
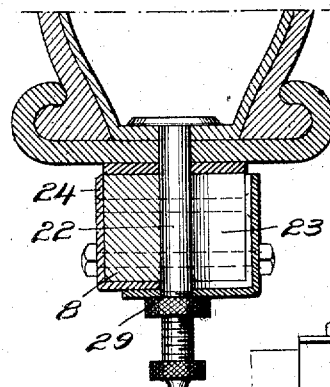
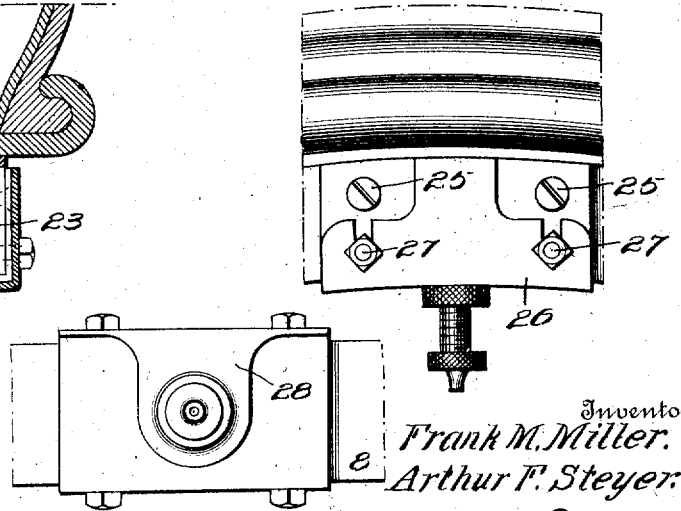

UNITED STATES PATENT OFFICE.

FRANK M. MILLER AND ARTHUR F. STEYER, OF PONTIAC, MICHIGAN.

TIRE-RIM.

988,890.

Specification of Letters Patent. Patented Apr. 4, 1911.

Application filed September 14, 1909. Serial No. 517,708.

*To all whom it may concern:*

Be it known that we, FRANK M. MILLER and ARTHUR F. STEYER, citizens of the United States, residing at Pontiac, in the county of Oakland and State of Michigan, have invented new and useful Improvements in Tire-Rims, of which the following is a specification.

This invention relates to pneumatic tires, the object of the invention being to provide means whereby a tire while either in an inflated or deflated condition may be quickly applied to and removed from the felly of a wheel without disconnecting the outer shoe and inner tube, the main object of the invention being to provide a construction which will admit of a tire while inflated being quickly applied to a wheel thereby saving valuable time and overcoming the annoyance incident to the use of pneumatic tires as employed at the present time, requiring no inflation of the tire after it has been connected with the wheel.

With the above and other objects in view, the nature of which will more fully appear as the description proceeds, the invention consists in the novel construction, combination and arrangement of parts as herein fully described, illustrated and claimed.

Figure 1:
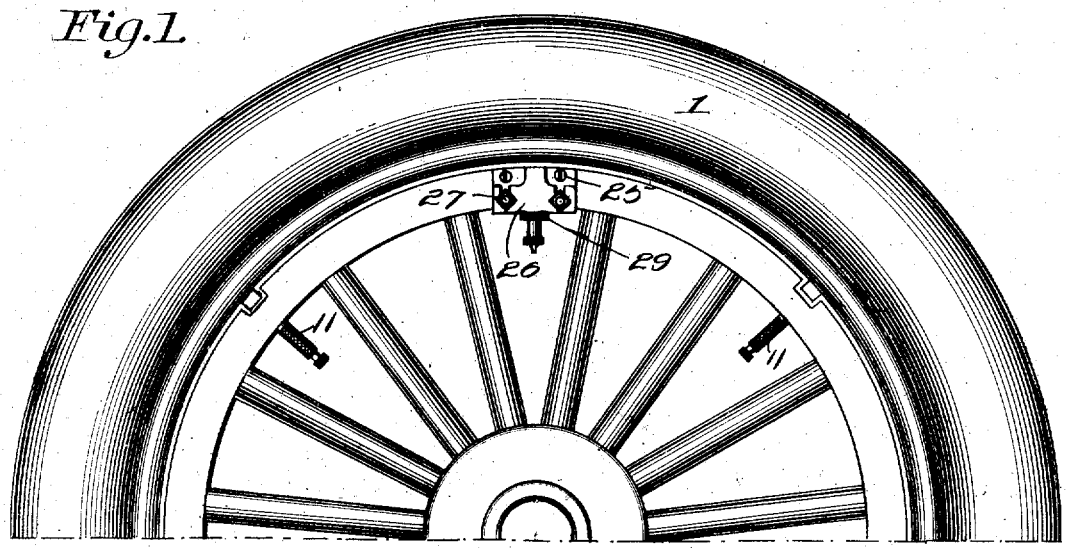
Figure 3:
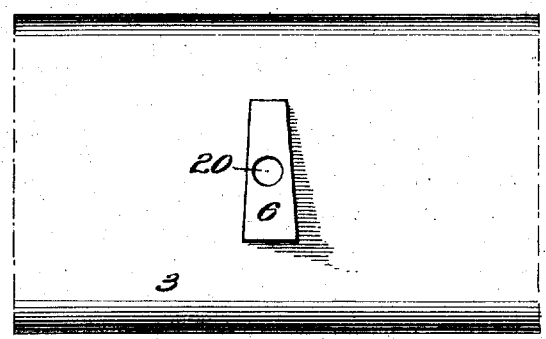
Figure 5:
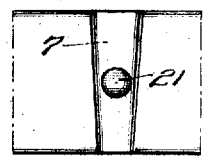
Figure 4:
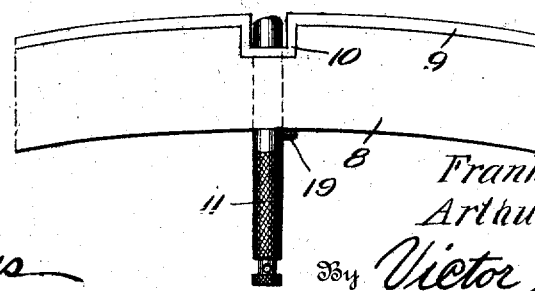

In the accompanying drawings:—Figure 1 is a side elevation of a portion of a wheel, and tire, embodying the present invention. Fig. 2 is a cross section through the same on an enlarged scale. Fig. 3 is an inner face view of a portion of the rim. Fig. 4 is a side elevation of the same. Fig. 5 is a face view of the periphery of the felly. Fig. 6 is a detail vertical longitudinal section taken at right angles to Fig. 2, omitting the tire. Fig. 7 is a detail section, showing the relation between the locking pin and the retainer ferrule or key-hole plate. Fig. 8 is a cross section taken adjacent to the valve stem, showing the means for securing the valve tube in place. Fig. 9 is a side elevation of the same. Fig. 10 is a plan view of the same, looking toward the inner side or face of the felly.

Referring to the drawings, 1 designates the outer shoe or casing of a pneumatic tire, 2 the inner tube and 3 the tire carrying rim provided with the usual clencher flanges 4 adapted to receive and hold the clencher beads 5 of the tire, as clearly shown in Figs. 2 and 8, the said parts being of the usual construction and arrangement.

In carrying out the present invention, the rim 3 is provided on its inner face with transversely extending taper lugs 6 which project a short distance from the inner face of the rim, as best shown in Figs. 2 and 6 and are adapted to be received in correspondingly shaped tapered sockets 7 designed to receive the lugs 6 by pushing the rim 3 upon the felly 8 of the wheel in a lateral direction.

By reference to Figs. 4 and 6, it will be noted that the felly 8 is encircled by a metal casing band 9 which is inwardly offset at 10 to form the taper lug sockets 7, above referred to, said casing band 9 serving to reinforce the felly 8 while forming the sockets for the taper lugs 6.

In order to fasten the rim in place on the felly 8, we provide lock pins 11 corresponding in number and location with the taper lugs 6 and lug sockets 7 above described. Each of these lock pins 11 extends radially inward through the rim 8, said rim being formed with an opening 12 for the purpose. The outer extremity of the pin 11 is beveled, as shown at 13, so that it may be readily depressed or moved inward by the rim 3 as the latter is slid laterally over the felly 8 as will be understood by reference to Fig. 2. Within the openings 12, the pin 11 is provided adjacent to its outer end with a pin or collar 14 forming a bearing for one end of a coiled spring 15 which encircles the pin 11 and bears at its inner end against a loose collar 16 carried by the lock pin 11. At the inner end of the opening 12 and secured to the felly 8 is a key-hole plate or ferrule 17 having an offset or slot 13 designed to admit of the passage of a key or projection 19 on the lock pin 11, the key or projection 19 normally lying in the slot or offset 18, as shown in Figs. 2 and 7. The spring 15 urges the lock pin outward to its locking position as shown in Fig. 2, in which it will be observed that the outer extremity of the lock pin enters a notch or socket 20 in the rim 3, said lock pin passing through a corresponding hole 21 in the metal facing band 9. The lock pin 11 may, however, be drawn inward against the tension of the spring 15 and turned so as to move the key or projection 19 against the inner face of the felly 8, as shown in Fig. 6 and as indicated by dotted lines in Fig. 7, thereby holding the lock pin 11 out of engagement with the rim 3 to permit said rim to be moved off the felly of the wheel. Before replacing the tire and rim, the lock pins 11 are moved to allow the keys or projections 19 to reenter the slots 18, the rim 3 serving to move said lock pins inward when pushed on the felly while the springs 15 cause said lock pins to snap outward into engagement with the sockets in the rim 3.

In order to provide for the necessary movement of the valve tube which is shown at 22, the felly 8 is provided at the proper point with a lateral slot or entrance way 23 to admit the valve tube 22 to a central position, as shown in Fig. 8.

24 designates a valve plate which is substantially U-shaped as indicated in Figs. 8, 9 and 10, said plate 24 embracing the felly immediately adjacent to the slot 23 so as to reinforce and strengthen the same at such point to compensate for the weakening effect produced by the formation of the slot 23. The plate 24 may be secured to the felly by means of ordinary wood screws 25 or other suitable fastening means.

26 designates a valve gate or closure for the slot 23, said plate being substantially L-shaped in cross section as shown in Fig. 8, and being secured in place by means of bolts 27 or the equivalent thereof. The valve gate or closure 26 has a portion 28 which extends under the valve plate 24 and beneath the felly 8 and is formed with an opening to receive the valve tube 22, as shown in Fig. 8. When the tire and rim are in position on the felly and the valve tube 22 is in the position shown in Fig. 8, the usual collar or milled nut 29 is screwed up against the valve gate 26 thus holding the valve tube securely.

In order to remove the tire and rim, it is only necessary to move the locks 11 inward and give them a partial turn to lock them in their inward position. The nut 29 is then loosened and the bolts 27 or the nuts thereof removed. This permits the valve gate or closure 27 to be removed with the tire and rim which may then be easily slid laterally out of engagement with the wheel felly. To replace the tire and rim, the lock pins 11 are restored to their outward position and the rim and tire are then slid laterally over the felly 8 until the lock pins snap into engagement with the sockets in the taper lugs 20 which fit tightly in the lug sockets 7, and prevent the rim and tire from creeping around the felly. The bolts 27 are then replaced and the nut 29 tightened. The operation may be quickly performed and renders it possible to put a new tire previously inflated, on the rim of the wheel in a very short space of time.

We claim:—

1. The combination of a wheel felly having a radially disposed slot extending inwardly from one side, a tire carrying rim mounted on the felly and removable laterally therefrom, means for securing the rim and felly together, a radially disposed valve tube connected with the rim and disposed in the slot, an L-shaped member for closing the side and bottom of the slot and having an opening in its bottom through which the valve tube extends and having slots in its vertical portion, a nut on the tube arranged to screw home against the member and serving to retain the member on the tube when the rim is detached from the felly, and fastenings in the felly extending through the said slots of the vertical portion of the members to clamp the latter in place.

2. The combination of a wheel felly having a radially disposed slot extending inwardly from one side, a tire carrying rim mounted on the felly and removable laterally therefrom, means for securing the rim and felly together, a radially disposed valve tube connected with the rim and disposed in the slot, an L-shaped member for closing the side and bottom of the slot and having an opening through which the valve tube extends, a nut on the tube arranged to screw home against the member and serving to retain the member on the tube when the rim is detached from the felly, and fastenings extending through the member and felly to coöperate with the said nut for holding the member in place.

3. The combination of a wheel felly having a slot extending inwardly from one side and a U-shaped metal piece spanning the felly from the inside and having a slot registering with the slot of the felly, said metal piece forming a reinforcement for the slotted portion of the felly, with a rim detachably secured to the felly, a pneumatic tire secured to the rim, a valve tube secured to the tire and passing from the rim and arranged to move laterally through the slots of the felly and said metal piece, a member carried by the tube and arranged to close the slot of the felly, bolts extending through the felly and said U-shaped piece and also through the member and disposed transversely to and at opposite sides of the valve tube for securing the member to the said U-shaped piece, and a nut threaded on the tube coöperating with the bolts for holding the member in place.

4. The combination of a wheel felly having a radially disposed opening, a band extending around the felly provided with a transversely extending tapering recess, said recess having an opening in its bottom registering with and of less diameter than the opening of the felly, a longitudinal and rotatably mounted locking pin extending through the openings of the felly and band and having a beveled end, a collar fixed on the pin at a point inwardly from the beveled end to normally engage the under side of the band, a spring encircling the pin and disposed in the opening of the felly, a ferrule secured to the felly and disposed at the inner end of the opening thereof and forming a bearing for the pin, said ferrule having a recess, and a projection on the pin adapted to enter the recess when the pin is in locking position, with a rim provided with a tapering lug adapted to enter said recess in the band, said lug having an opening into which the locking pin extends.

In testimony whereof we affix our signatures in presence of two witnesses.

FRANK M. MILLER.
ARTHUR F. STEYER.

Witnesses:
JOHN WALOPOCKET,
HARRY H. SNOWDON.

---

Copies of this patent may be obtained for five cents each, by addressing the "Commissioner of Patents, Washington, D. C."